United States Patent [19]
Uematsu et al.

[11] Patent Number: 6,037,753
[45] Date of Patent: Mar. 14, 2000

[54] CONTROL DEVICE FOR VEHICLE GENERATOR

[75] Inventors: Tadashi Uematsu, Kariya; Tadatoshi Asada, Anjo, both of Japan

[73] Assignee: Denso Corporation, Kariya, Japan

[21] Appl. No.: 09/044,823

[22] Filed: Mar. 20, 1998

[30] Foreign Application Priority Data

Mar. 21, 1997 [JP] Japan .................................. 9-068020

[51] Int. Cl.[7] ................................................. H02H 7/06
[52] U.S. Cl. ................................................................ 322/29
[58] Field of Search .................................. 322/29, 46, 59

[56] References Cited

U.S. PATENT DOCUMENTS

| | | | |
|---|---|---|---|
| 4,409,539 | 10/1983 | Nordbrock et al. | 322/28 |
| 4,634,954 | 1/1987 | Kato et al. | 322/28 |
| 5,061,889 | 10/1991 | Iwatani et al. | 322/28 |
| 5,497,071 | 3/1996 | Iwatani et al. | 322/28 |
| 5,754,031 | 5/1998 | Kanazawa et al. | 322/28 |

FOREIGN PATENT DOCUMENTS

| | | |
|---|---|---|
| 6-237541 | 8/1994 | Japan . |
| 6-276796 | 9/1994 | Japan . |
| 8-205497 | 8/1996 | Japan . |

*Primary Examiner*—Thomas M. Dougherty
*Assistant Examiner*—Peter Medley
*Attorney, Agent, or Firm*—Pillsbury Madison & Sutro LLP

[57] ABSTRACT

A control device for a vehicle alternator having a field coil, and an auxiliary permanent magnet. The control device includes voltage regulator, a generation-condition detecting circuit having a frequency sensor and a comparator for comparing a frequency of the output voltage with a reference value and a power source circuit for supplying electric power to the generation-condition detecting circuit when the output voltage becomes equal to or higher than a voltage that is generated without the field current. The generation-condition detecting circuit allows the voltage regulator to supply the field coil with controlled electric current only when the frequency of the output voltage is higher than the reference value.

5 Claims, 3 Drawing Sheets

CONTROL DEVICE FOR VEHICLE GENERATOR

CROSS REFERENCE TO RELATED APPLICATION

The present application is based on and claims priority from Japanese Patent Application Hei 9-68020 filed on Mar. 21, 1997, the contents of which are incorporated herein by reference.

BACKGROUND OF THE INVENTION

1. Field of the Invention

The present invention relates to a control device for a vehicle alternator, particularly a device for controlling supply of the field current of the alternator according to operation conditions of the alternator.

2. Description of the Related Art

In an alternator disclosed in JP-A6-276796, field current is supplied when output voltage generated due to remanent magnetism of the rotor core is detected by a voltage detecting circuit. In an alternator disclosed in JP-A-8-205497 a plurality of permanent magnets are fixed to the rotor core to provide such output voltage to be detected by a voltage detecting circuit for supplying the field coil with field current.

However, both voltage detecting circuits disclosed in above publications are powered by a vehicle battery. Therefore, the voltage detecting circuits operate even when the alternator does not operate and, accordingly, unnecessary current is always supplied from the battery. This deteriorates the battery and the engine starting performance. In addition, if such a circuit happens to be exposed to salt water or muddy water, leak current may flow from the battery to the output terminal of the alternator. This causes the voltage detecting circuit to erroneously allow supplying the field coil with current. This results in abnormal discharge of the battery.

SUMMARY OF THE INVENTION

Therefore, a main object of the present invention is to provide an improved control device for a vehicle alternator in which field current is supplied to the field coil properly. The field coil is supplied with field current when the rotation speed of the alternator becomes a preset value, while leak current does not flow from the battery when the rotation speed is lower than the preset value even if the control device is exposed to salt water or muddy water.

According to the present invention, a control device includes a voltage regulator, a generation-condition detecting circuit having a frequency sensor of the output voltage and a comparator for comparing a frequency of the output voltage with a reference value and an electric power source for supplying electric power to the generation-condition detecting circuit when the output voltage becomes equal to or higher than a voltage that is generated without the current to be supplied to the field coil. The generation-condition detecting circuit allows the voltage regulator to supply the field coil with controlled electric current only when the frequency of the output voltage is higher than the reference value. The electric power source preferably has a capacitor connected to the output terminal thereof and a rectifying element for supplying the generation-condition detecting circuit with rectified current.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
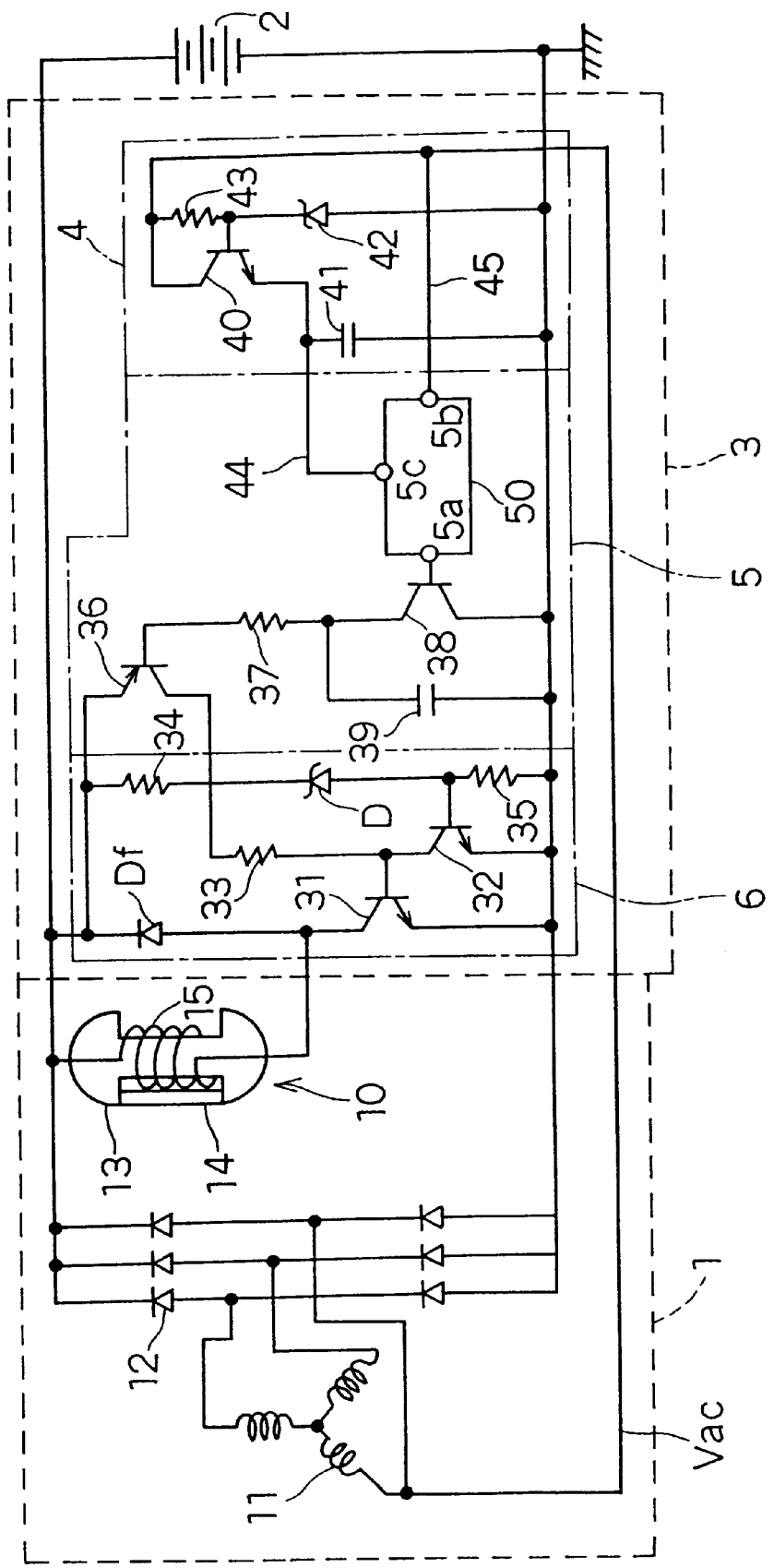
FIG. 1 is a circuit diagram of a control device for a vehicle alternator according to a first embodiment of the present invention.

A control device according to a first embodiment of the present invention is described with reference to FIGS. 1 and 2.

Alternator 1 has rotor 10, a stator having output winding 11 and rectifier 12. Rotor 10 has claw poles 13, permanent magnet 14 and field coil 15. Control device 3 is composed of power source circuit 4, generation condition detecting circuit 5 and voltage regulator circuit 6.

Terminal of field coil 15 is connected to the high-side terminal of battery 2, and the other terminal thereof is connected to an output terminal of voltage regulator circuit 6. The output terminal of voltage regulator circuit 6 is the collector of NPN switching transistor 31, whose emitter is grounded.

In voltage regulator circuit 6, flywheel diode Df is connected in parallel with field coil 15. The base of switching transistor 31 is connected to the collector of PNP transistor 36 of generation-condition detecting circuit 5 through resistor 33 and to the collector of NPN transistor 32 directly. The emitter of transistor 32 is directly grounded, and the base thereof is connected to the anode of zener diode D and to an end of resistor 35 whose the other end is grounded. The cathode of diode D is connected to the high-side terminal of battery 2 through resistor 34.

In generation-condition detecting circuit 5, transistor 36 provides switching transistor 31 of voltage regulator circuit 6 with the base current. The base of transistor 36 is connected to the collector of NPN transistor 38 through resistor 37. The emitter of transistor 38 is grounded directly, and the base thereof is connected to output terminal 5a of comparator circuit 51. Capacitor 39 is connected between the collector and the emitter of transistor 38 to stabilize the operation of transistor 38. Comparator circuit 50 has output terminal 5a connected to the base of transistor 38, input terminals 5b and 5c connected to power source circuit 4 through leads 44 and 45 respectively. Transistor 38 turns on or off according to an output signal of comparator circuit 51.

In power source circuit 4, capacitor 41 is connected between the emitter of NPN transistor 40 and a ground, and zener diode 42 is connected between the base of the same and a ground. Lead 45 connects input terminal 5b of comparator circuit 50 and a phase terminal of output winding 11. Lead 45 is connected to the collector of transistor 40 directly and to the base thereof through resistor 43.

When alternator 1 is driven by an engine, output windings 11 generate three-phase ac volt due to interlinkage of magnetic flux of permanent magnet 14. Then, phase voltage Vac is applied to power source circuit 4 and, through lead 45, to generation-condition detecting circuit 5. Consequently, transistor 40 is turned on and off alternately and rectifies ac voltage Vac to charge capacitor 41. Zener diode 42 stabilizes the output voltage.

When the output voltage (capacitor voltage) becomes a set value, generation-condition detecting circuit 5 starts operation. Generation-condition detecting circuit 5 detects the frequency of phase voltage Vac and turns on transistor 38 when the frequency becomes a value corresponding to a suitable rotation speed for alternator 1 to charge battery 2. When transistor 38 turns on, transistor 36 turns on to allow transistor 31 supplying field coil 15 with field current. Thus, the field current is supplied to the field coil only when the power generation is necessary.

If the battery voltage becomes higher than an upper limit decided by zener diode D, transistor 32 turns on to turn off switching transistor 32. Thus, the output voltage is regulated.

When alternator 1 stops, phase voltage Vac disappears and generation-condition detecting circuit 5 and power source circuit 4 are not operated. Consequently, transistor 38 is turned off, transistor 36 is turned off and switching transistor 31 is also turned off.

Figure 2:
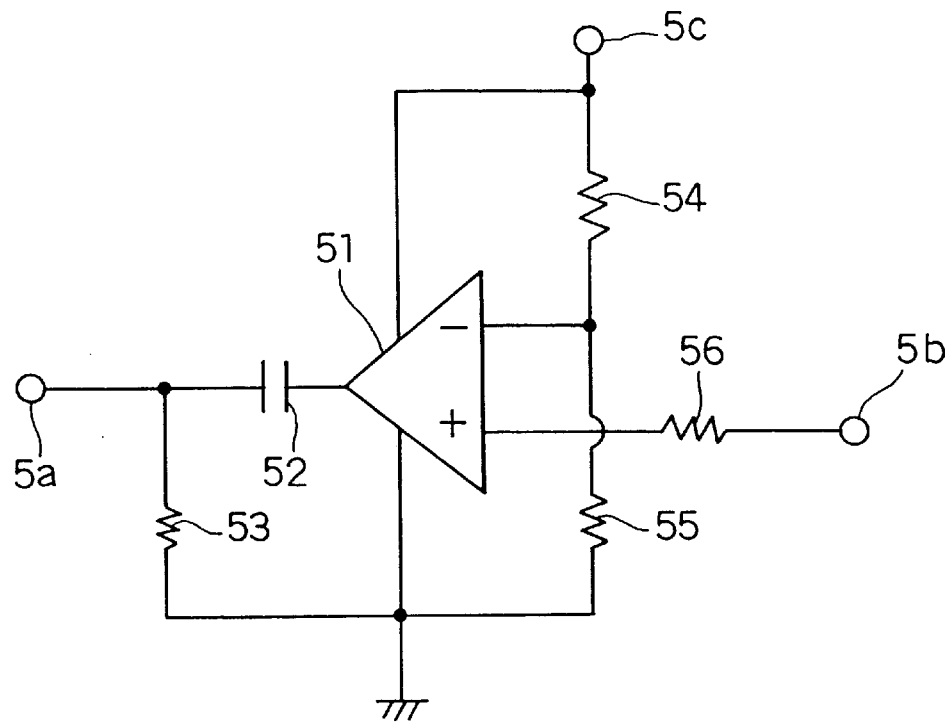
FIG. 2 is a circuit diagram of the generation-condition detecting circuit shown in FIG. 1.

FIG. 2 illustrates a circuit diagram of comparator circuit 50. Phase voltage Vac is applied from terminal 5b through resistor 56 to an non-inverting input terminal of comparator 51. Power source voltage is applied from terminal 5c directly to the drive circuit of comparator 51 and through resistor 54 to the inverting terminal of comparator 50. A series circuit of resistors 54 and 55 connected between terminal 5c and a ground forms a voltage dividing circuit. Capacitor 52 is connected between the output terminal of comparator 51 and output terminal 5a of comparator circuit 50. A series circuit of capacitor 52 and resistor 53 is connected between the output terminal of comparator 51 and a ground and forms a differential circuit.

When phase voltage Vac increases and power source circuit 4 supplies rectified voltage through lead 44 to comparator 51, comparator 51 starts operation. When phase voltage Vac applied to the non-inverting terminal becomes higher than the voltage applied to the inverting terminal, comparator 51 provides a high-level voltage, which is applied to the base of transistor 38 through capacitor 52 and terminal 5a.

Transistor 38 of generation-condition detecting circuit 5 turns on immediately after comparator 51 provides a high level voltage and turns off when capacitor 52 is charged to stop supplying the base current of transistor 38. The turn-on period of transistor 38 is decided by a time constant that is the product CR of the capacitance C of capacitor 52 and the resistance R of resistor 53. If the frequency of phase voltage Vac becomes higher than a frequency decided by the time constant, comparator 51 provides transistor 38 with a high level voltage to keep transistor 38 on.

Even if phase winding 11 generates voltage due to some leak current and comparator 51 provides a high level voltage to turn on transistor 38, transistor 38 turns off soon thereafter due to the differentiation circuit composed of capacitor 52 and resistor 53.

Figure 3:
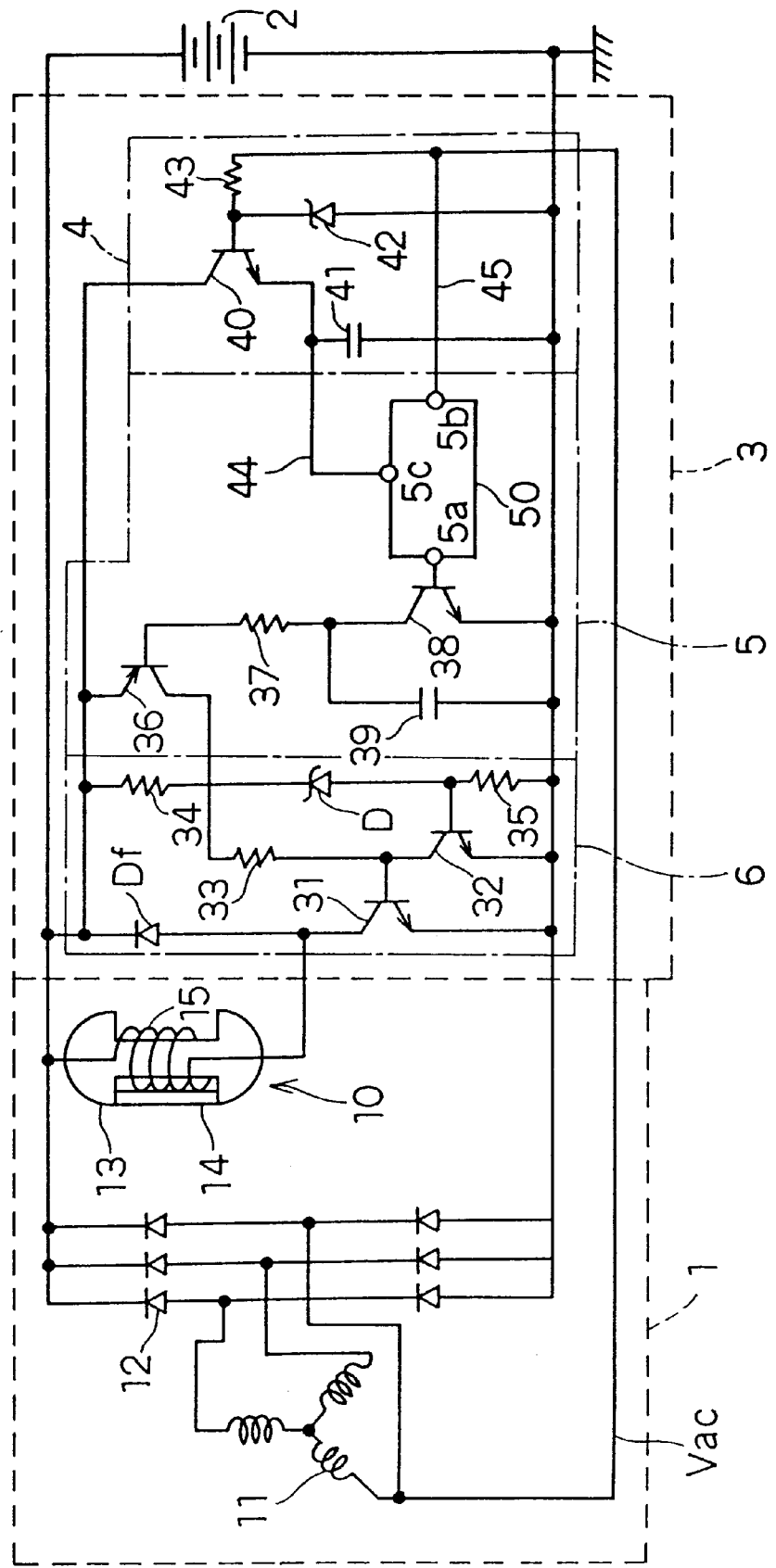
FIG. 3 is a circuit diagram of a control device according to a second embodiment of the present invention.

The collector of transistor 40 of power source circuit 4 can be connected to the high-side terminal of battery 2 as shown in FIG. 3. In this variant control device, generation-condition detecting circuit 5 can be driven by battery 2 even when phase voltage Vac is not high enough to drive the same as far as the frequency of phase voltage Vac becomes higher than the frequency decided by the time constant as described above.

Figure 4:
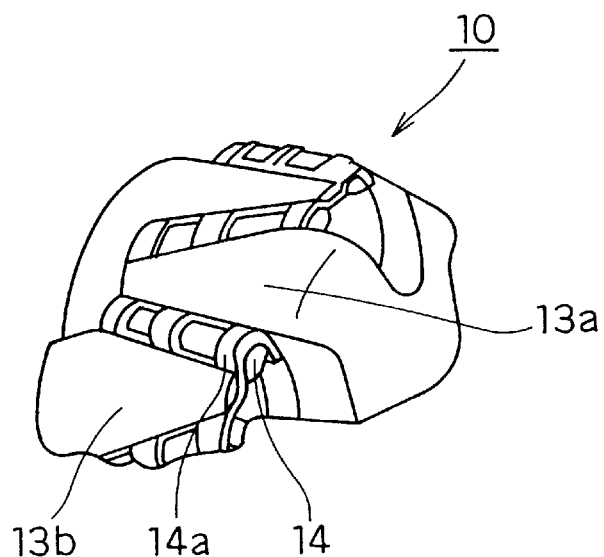
FIG. 4 is a fragmentary perspective view illustrating a rotor of an alternator having claw poles.

A portion of rotor core 13 is illustrated in FIG. 4. Rotor core 13 has a pair of claw poles 13a and 13b, which are excited to form N-pole and S-pole respectively. Auxiliary magnets 14 for increasing effective magnetic flux and magnet holders 14a are inserted into gaps between each pair of claw poles 13a and 13b. Therefore, when rotor 10 rotates phase voltage Vac is generated whether or not the field current is supplied to field coil 15.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A control device for a vehicle alternator having an output winding, a field coil, an auxiliary permanent magnet for supplying magnetic field in addition to magnetic field generated by said field coil supplied with electric current, said control device comprising:

a voltage regulator for regulating output voltage of said alternator by controlling said electric current supplied to said field coil;

a generation-condition detecting circuit having a frequency sensor of said output voltage and a comparator for comparing a frequency of said output voltage with a reference value, said generation-condition detecting circuit allowing said voltage regulator to supply said field coil with controlled electric current only when said frequency of said output voltage is higher than said reference value; and a power source circuit connected to said output winding for supplying electric power to said generation-condition detecting circuit from said output winding when said output voltage becomes equal to or higher than a voltage that is generated when said electric current is not supplied to said field coil.

2. A control device is claimed in claim 1, wherein said power source circuit comprises an output terminal connected to said generation-condition detecting circuit and a capacitor connected to said output terminal for stabilizing electric power supplied from said output terminal.

3. A control device as claimed in claim 2, wherein said power source circuit further comprises a rectifying element for supplying said generation-condition detecting circuit with rectified current.

4. A control device as claimed in claim 3, said rectifying element comprises a PNP transistor.

5. A control device as claimed in claim 1, wherein said alternator comprises a rotor having a plurality of claw poles and said permanent magnet is disposed between adjacent two of said claw poles.

* * * * *